Dec. 27, 1932.  C. O. BUENGER  1,892,649
CHECK VALVE
Filed May 15, 1930

Inventor:
Clarence O. Buenger
By A. Miller Belfield
Atty.

Patented Dec. 27, 1932

1,892,649

UNITED STATES PATENT OFFICE

CLARENCE O. BUENGER, OF CHICAGO, ILLINOIS, ASSIGNOR TO HILLS-McCANNA COMPANY, OF CHICAGO, ILLINOIS, A CORPORATION OF ILLINOIS

CHECK VALVE

Application filed May 15, 1930. Serial No. 452,612.

This invention relates to a check valve and more particularly to a ball check valve.

One of the objects of the invention is to provide self-cleaning means for the valve.

Another object is to provide means for preventing the ball from becoming lodged out of its seat.

Another object of the invention is to provide means for readily disassembling the valve parts for repair without dismounting the associated pipe connections.

Further objects will appear and be pointed out in the claims.

In the drawing—

Figure 1:
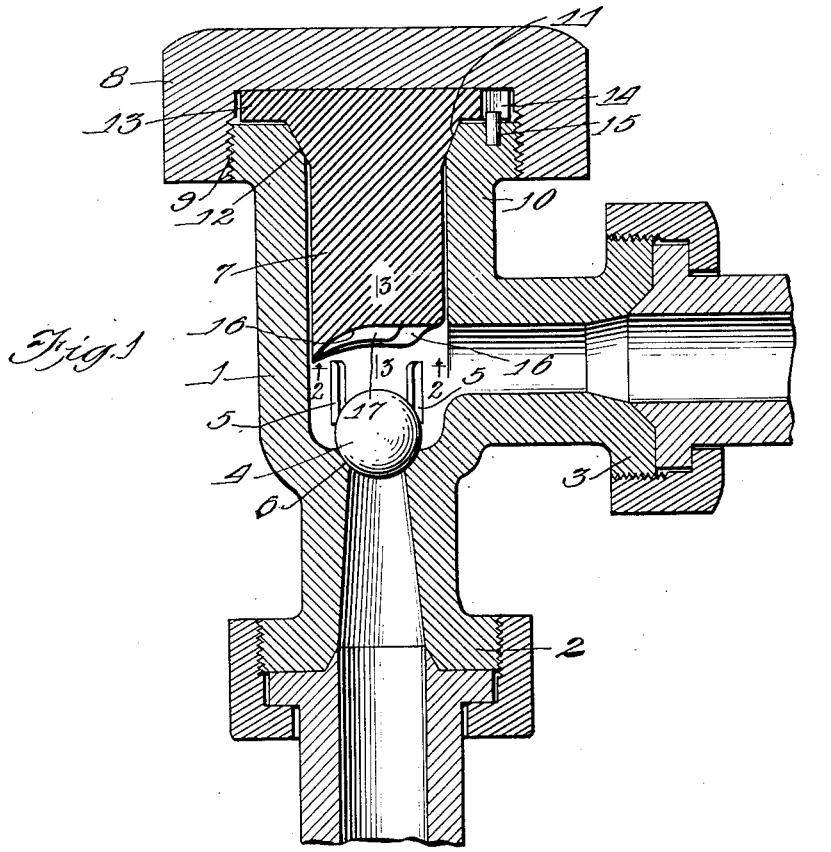
Fig. 1 is a vertical trans-axial section of the valve equipped with this invention.

The main body 1 of an angle valve has the two pipe connections 2 and 3 constituting the inlet and outlet ports respectively. A ball valve 4 is guided by the ribs 5—5 to its seat 6. A plug 7 limits the upward travel of the ball. This plug 7 is held in place by a cap 8 which has screw-threaded engagement at 9 with the upwardly extending portion 10 of the valve body 1.

The plug 7 thus secured in place by the cap 8 has the tapered portion 11 which cooperates with the correspondingly tapered portion 12 of the part 10 for preventing leakage. The plug 7, just above the tapered portion 11, has an annular flange 13 with a peripheral notch 14 cooperating with the pin 15 driven into the valve body, for properly positioning the plug 7.

Figure 2:
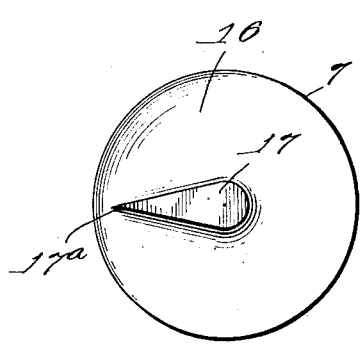
Fig. 2 is an end view of the plug from the line 2—2 of Fig. 1.
Figure 3:
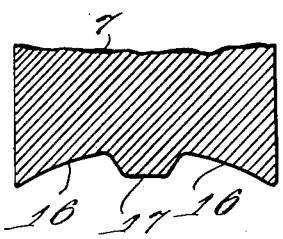
Fig. 3 is a section at the line 3—3 of Fig. 1.

In valves of this kind the ball may have a tendency to stick, due to accumulations thereon. It may stick to its seat, so therefore the plug 7 is made removable as above explained, so that the ball may be easily reached. The ball in the absence of provisions to the contrary might stick to the bottom of the plug; to this end therefore, the bottom of the plug is concave as shown at 16 and a rib 17 is formed projecting from the surface thereof so as to present minimum contact surface for the ball. The concavity of the plug as seen in Fig. 1 is relieved at the side thereof adjacent the outlet 3 of the valve, with the result that the fluid when traversing from the inlet past the ball and up through this outlet, will have a tendency to rotate the ball 4 so that it will contact the seat at various parts of its surface, thereby preventing any tendency of "grooving" the ball by repeated contact with the seat. A further advantage of so concaving the plug is that it will be self-cleaning. As will be seen in Fig. 2, the rib 17 is formed with a point 17ª which faces the oncoming fluid and prevents any foreign substance from accumulating therearound and further discourages any accumulation at the concave surface 16.

It will thus be seen that a valve so constructed will be, in a large measure, self-cleaning, and easily disassembled in the event that foreign matter of unusual size and quantity finds its way into the valve body.

Changes and modifications may be made in the details of construction without departing from the spirit of this invention.

I claim:—

1. In a valve of the character described, a removable plug having its lower end so shaped that the greater portion of its surface is higher than the remaining portion, said remaining portion comprising a triangular shaped rib for the end of said plug.

2. In a valve of the character described, a removable plug having its lower end so shaped that the greater portion of its surface is higher than the remaining portion, said remaining portion comprising a stream-lined shaped rib for the end of said plug.

3. In a valve of the character described, a removable plug having a concave shaped end and a stream-lined rib with the thin end of said rib adjacent the periphery of said plug on one side.

4. In a valve of the character described, a removable plug having a tapered portion, a concave rib on the lower end of said plug, a tapered seat in said valve adapted to co-operate with the tapered portion of the plug, said tapered portion and seat forming a fluid-tight joint, and a covering member completely covering the end of said plug and co-operating with the valve body to force the two tapers together.

5. A valve structure comprising an angle valve body having an inlet port and an outlet port at right angles to each other, a tapered passageway leading inwardly from each port, a ball valve positioned at the intersection of said passageways, a removable plug non-rotatably mounted above said ball, said plug having a concavely shaped lower end and a stream line rib extending downwardly from said end.

6. A valve structure comprising an angle valve body having an inlet port and an outlet port at right angles to each other, a tapered passageway leading inwardly from each port, a ball valve positioned at the intersection of said passageways, a removable plug non-rotatably mounted above said ball, said plug having a concavely shaped lower end and a stream line rib extending downwardly from said end and directed toward one of said ports.

In witness whereof, I hereunto subscribe my name this 13th day of May A. D., 1930.

CLARENCE O. BUENGER.